US012030339B2

(12) United States Patent
Duffy et al.

(10) Patent No.: US 12,030,339 B2
(45) Date of Patent: Jul. 9, 2024

(54) PASSIVE VARIABLE FRICTION PEN

(71) Applicant: SOCIÉTÉ BIC, Clichy (FR)

(72) Inventors: David Duffy, Zurich (CH); Bernadette Elliott-Bowman, Leatherhead Kent (GB)

(73) Assignee: SOCIÉTÉ BIC, Clichy (FR)

( * ) Notice: Subject to any disclaimer, the term of this patent is extended or adjusted under 35 U.S.C. 154(b) by 101 days.

(21) Appl. No.: 17/999,801

(22) PCT Filed: May 25, 2021

(86) PCT No.: PCT/EP2021/063874
§ 371 (c)(1),
(2) Date: Nov. 23, 2022

(87) PCT Pub. No.: WO2021/239718
PCT Pub. Date: Dec. 2, 2021

(65) Prior Publication Data
US 2023/0234392 A1 Jul. 27, 2023

(30) Foreign Application Priority Data
May 29, 2020 (EP) .................................... 20315284

(51) Int. Cl.
*B43K 7/12* (2006.01)
*B43K 1/08* (2006.01)
*B43K 7/00* (2006.01)

(52) U.S. Cl.
CPC ................ *B43K 7/00* (2013.01); *B43K 1/082* (2013.01); *B43K 1/084* (2013.01); *B43K 1/086* (2013.01)

(58) Field of Classification Search
CPC .......... B43K 1/08; B43K 1/082; B43K 1/084; B43K 1/086; B43K 7/00
USPC .......................................................... 401/209
See application file for complete search history.

(56) References Cited

FOREIGN PATENT DOCUMENTS

| | | | | |
|---|---|---|---|---|
| DE | 10017498 A1 * | 10/2001 | ............... | B43K 1/08 |
| EP | 1265757 A1 | 12/2002 | | |
| WO | 0154920 A1 | 8/2001 | | |
| WO | 2019049247 A1 | 3/2019 | | |

OTHER PUBLICATIONS

International Search Report and Written Opinion issued in International Application No. PCT/EP2021/063874 on Aug. 3, 2021 (10 pages).

* cited by examiner

*Primary Examiner* — Jennifer C Chiang
(74) *Attorney, Agent, or Firm* — Bookoff McAndrews, PLLC

(57) ABSTRACT

A writing instrument configured to apply a writing material or liquid to a surface, comprising a socket, and a ball arranged in the socket, characterized by at least one first component which is arranged to come into contact with the ball, wherein the at least one first component comprises a first material having surface properties such that the friction coefficient between the ball and the at least one first component decreases when the force acting from the ball on the at least one first component increases at least within a certain range of forces.

20 Claims, 5 Drawing Sheets

PASSIVE VARIABLE FRICTION PEN

CROSS-REFERENCE TO RELATED APPLICATION(S)

This application is a National Stage application of International Application No. PCT/EP2021/063874, filed on May 25, 2021, now published as WO2021239718, which in turns claims priority from European patent application EP20315284.8, filed on May 29, 2020, now published as EP3915799, the '799 publication being incorporated herein by reference.

TECHNICAL FIELD

The present disclosure relates to writing instruments using a ball in a socket for applying material or liquid to a surface.

TECHNICAL BACKGROUND

Writing instruments, such as ballpoint pens, are designed to use the rotation of the ball within the socket during writing to apply a material or a liquid, for example ink, to a surface. The rotation of the ball is commonly generated by the combination of the force with which the user applies the pen on the writing surface, and the writing movement. Generally, the components of the pen are designed such that the ball rotates easily within the socket. Nevertheless, depending on, e.g., the constitution of the material or liquid used within the pen, the structure of the writing surface, or the writing behavior of the user, the ball can face some resistance towards motion. Motion resistance variations can occur while writing, which results in disturbance of the writing performance of the pen and in disturbance of the writing feeling for the user.

The object of the present disclosure is to provide a writing instrument for applying a material or a liquid to a surface with improved performance and improved user comfort.

SUMMARY

The present disclosure relates to a writing instrument as defined in claims 1 and 4. The dependent claims depict advantageous embodiments of the present disclosure.

According to the present disclosure, a writing instrument that is configured to apply a writing material or a liquid to a surface, comprises a socket, a ball arranged in the socket, and at least one first component which is arranged to come into contact with the ball. The at least one first component comprises a first material having surface properties such that the friction coefficient between the ball and the at least one first component decreases when the force acting from the ball on the at least one first component increases at least within a certain range of forces.

The advantage of a decreasing friction coefficient with an increasing force is that the ball is less subjected to friction when the force applied on it during writing increases. Therefore, the user needs to apply less pressure on the writing instrument to slide the ball on a writing surface. Further, a greater control over the motion of the ball within the writing instrument, therefore over the feel and utility of the writing instrument, is given.

In addition or alternatively, the decreasing friction coefficient between the ball and the at least one first component may refer to the dynamic friction coefficient, wherein the friction coefficient between the ball and the at least one first component may decrease in case of an increasing force acting from the ball on the at least one first component while having a relative movement of the ball surface with respect to the at least one first component after having overcome the static friction.

Further, within at least a certain range of forces, the dynamic force acting between the ball and the at least one first component may decrease when the force acting from the ball on the at least one component increases, while having a relative movement from the ball surface with respect to the at least one first component.

According to another aspect of the disclosure, a writing instrument configured to apply a writing material or liquid to a surface, comprises a socket, a ball arranged in the socket, and at least one first component. The at least one first component is in contact with the ball, and within at least one certain range of forces, the dynamic force acting between the ball and the at least one first component decreases when the force acting from the ball on the at least one component increases, while having a relative movement from the ball surface with respect to the at least one first component.

The first material may comprise one or more surface elements in contact with the ball, wherein the one or more surface elements comprise at least one first surface having at least one first surface roughness and at least one second surface having at least one second surface roughness that is smaller than the at least one first surface roughness, wherein the surface area of the at least one second surface in contact with the ball may increase when the force acting from the ball on the at least one first component increases.

With that, it is achieved that the motion resistance of the ball within the writing instrument varies depending on the roughness of the surface of the at least one first component which is in contact with the ball.

The advantage of different surface roughness within the at least one first component has the advantage of a passive (i.e. non-powered) variability in the friction coefficient between the surfaces of two components that are in contact. With that, it is possible to adapt the product features to specific needs in terms of for example friction-pressure response, even while using the product.

Preferably, the surface area of the at least one first surface in contact with the ball may decrease when the force acting from the ball on the at least one first component increases. Further, the surface area of the at least one first surface in contact with the ball may decrease when the surface area of the at least one second surface in contact with the ball increases, and vice versa. Additionally, the one or more surface elements may be configured to deform or bend under the action of the force from the ball. Herein, the surface area of the at least one first surface may be made of one or a combination of more than one smaller surface areas. Additionally, the surface area of the at least one second surface may be made of one or a combination of more than one smaller surface areas. Moreover, the surface area of the at least one first surface and the surface area of the at least one second surface may be in contact or distant from each other.

The first material may be made of a plastic material, such as a polymer. The at least one first component may be entirely constituted of the first material or only coated with the first material. The at least one first component may preferably have one or more contact surfaces with the ball. Further, the at least one first component may be one part or a combination of more than one parts.

The one or more contact surfaces of the at least one first component with the ball may be at least partially plane, or curved, or circular, or spherical, or conical. For example, the at least one first component may be in the form or a ring positioned above the ball in a ball-point pen. The contact surface of the at least one first component may preferably be inclined. Moreover, the one or more contact surfaces of the at least one first component may be spherical or concave, wherein the curvature radius of the spherical or concave surface of the at least one first component may equal the outer radius of the ball. In this way, a greater surface may be in contact between the at least one first component and the ball.

The force acting from the ball on the at least one first component during writing may be in the range of 0 to 10 N, in particular 0 to 8 N, more in particular 0 to 6 N. Preferably, the force acting from the ball on the at least one first component may define a first force range and a second force range. The first force range may be situated in the range of 0.01 N to 5 N, in particular 0.1 N to 2 N, more in particular 0.1 N to 0.5 N and the second force range may be respectively situated in the range of 5 N to 10 N, in particular 2 N to 10 N, more in particular 0.5 N to 10 N. The friction coefficient between the ball and the at least one first component may be higher in the at least one first force range compared to the at least one second force range between the ball and the at least one first component wherein the friction coefficient is lower.

In addition or alternatively, the ball and the at least first one component may come into contact when the force between the ball and the surface is lower than 1 N, in particular lower than 0.8 N, more particular lower than 0.5 N. In fact, in the configuration where the ball of the writing instrument is not in contact with any surface, a gap may be present between the ball and the socket or the at least one first component.

The force acting from the ball on the at least one first component may increase when the force acting from the surface on the ball increases.

Moreover, the friction coefficient between the ball and the at least one first component may be in the range of 0.01 to 0.8, in particular 0.01 to 0.9, more particular 0.1 to 0.99 when the force acting between the ball and the at least one first component is maximum 10 N.

The writing instrument may further comprise a spring arranged within the socket, wherein the spring may be in contact with the at least one first component at a proximal end of the at least one first component. The spring may preferably be compressed when the force acting from the ball on the at least one first component increases and vice versa.

According to the present disclosure, the writing instrument may further comprise at least one second component which is arranged to come into contact with the ball, wherein the at least second component may comprise a second material having surface properties such that the friction coefficient between the ball and the at least one second component may increase when the force acting from the ball on the at least one second component increases at least within a certain range of forces. Preferably, the second material may be made of a metal material. Alternatively, the second material may be made or a plastic material.

The advantage of adding an at least one second component with "opposite" friction coefficient properties compared to the at least one first component is that, when the writing instrument is used with high pressure from the user, the friction coefficient between the ball and the at least one second component increases such that the movement of the ball within the socket is reduced. This results in reduced material or liquid flow and gives the user the feeling of too high pressure applied on the writing instrument. The integration of an at least one second component therefore presents a further control of the motion of the ball within the writing instrument.

The at least one second component may be entirely constituted of the second material or only coated with the second material. The at least one second component may preferably have one or more contact surfaces with the ball. Further, the at least one second component may be one part or a combination of more than one parts.

The one or more contact surfaces of the at least one second component with the ball may be at least partially plane, or curved, or circular, or spherical, or conical. The contact surface of the at least one second component may preferably be inclined. Moreover, the one or more contact surfaces of the at least one second component may be spherical or concave, wherein the curvature radius of the spherical or concave surface of the at least one second component may equal the outer radius of the ball.

The ball may come into contact with the at least one second component when the force acting from the ball on the at least one first component reaches a threshold force. The threshold force may preferably be situated within the second force range. Further, the friction coefficient between the ball and the at least one second component may be higher than the friction coefficient between the ball and the at least one first component. Preferably, the friction coefficient between the ball and the at least one second component may be in the range of 0.01 to 0.99, in particular 0.01 to 0.95, more particular 0.01 to 0.9 when the force acting between the ball and the at least one second component is equal to the threshold force.

In addition or alternatively, the ball may be in simultaneous contact with the at least one first component and the at least one second component. The resulting friction coefficient of the simultaneous contact between the ball and the at least one first component and the at least one second component may increase when the force acting from the ball on the at least one first component and the at least one second component increases. With that, it is achieved that the motion of the ball within the socket is further controlled, which contributes to enhanced control of the writing performance and writing comfort.

Although any of the previous embodiments may be used with a standard writing instrument comprising a ball in a socket, some optional features of a writing instrument may be outlined.

The socket may comprise a passage extending longitudinally across the socket, a proximal end and a distal end. The ball may be arranged in the passage at the distal end of the socket. The passage of the socket may be arranged in a way to receive and hold the ball at least partially within the passage of the socket and partially outside of the distal end of the socket, such that the ball can be in contact with the surface. Preferably, the ball may rotate within the socket when the ball is slid on the surface. The rotation of the ball may be disabled by the at least one first component at least within range of forces. Moreover, the rotation of the ball may be disabled by the at least one second component, at least within a range of forces.

The writing instrument may further comprise a reservoir configured to contain the material or liquid for applying on the surface. The reservoir may be connected with the socket. The material or liquid may flow from the reservoir to the passage of the socket. Further, the rotation of the ball may convey the material or the liquid from the passage of the socket to the surface. Preferably, the material or liquid may be made of at least a solvent of oil or water containing dye or pigment particles.

BRIEF DESCRIPTION OF THE DRAWINGS

Additional details and features of the disclosure are described in reference to the following figures in which.

DETAILED DESCRIPTION

Embodiments of the writing instrument according to the disclosure will be described in reference to the figures as follows.

Figure 1:
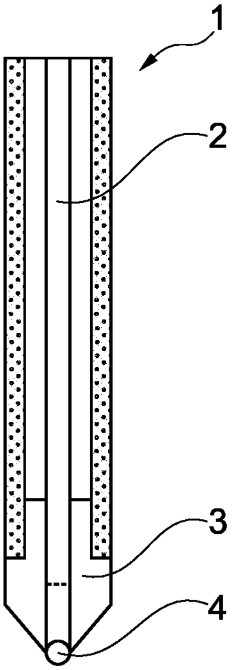
FIG. 1 is a schematic view of a ballpoint pen according to the state of the art.

FIG. 1 presents a common writing instrument, and more particularly a ballpoint pen as known in the state of the art. The ballpoint pen 1 comprises a reservoir 2 configurated to receive a material or liquid at least made of a solvent of oil or water containing dye or pigment particles, such as ink. The ballpoint pen 1 further comprises a socket 3, with a passage extending between a proximal and a distal end of the socket 3. The reservoir 2 is partially inserted and fixed at its distal end within the proximal end of the socket 3. A ball 4 is non-removably arranged in the distal end of the passage of the socket 3, where it can rotate freely within the socket 3 when the ball 4 is slid on a surface (not shown). In some embodiments, the ball 4 may rotate within a minimal gap situated between the ball 4 and the socket 3. The passage of the socket 3 is arranged in a way to receive and hold the ball 4 at least partially within the passage of the socket 3 and partially outside of the distal end of the socket 3. The reservoir 2 is in direct contact with the passage of the socket 3 such that the ink can flow from the reservoir 2 to the passage of the socket 3. In usage, the rotation of the ball 4 conveys the ink from the passage of the socket 3 to the outside of the ballpoint pen, where it can be applied on the surface. In contrary, when the ball 4 is not in movement, the ink generally stays within the passage of the socket 3. Nevertheless, "accidental writing" can occur when ink involuntarily escapes between the ball and the socket, this without any movement of the ball. To at least avoid this situation, and to contribute to additional advantages which will be described later, the writing instrument according to the present disclosure comprises improved structural and functional features.

Figure 2:
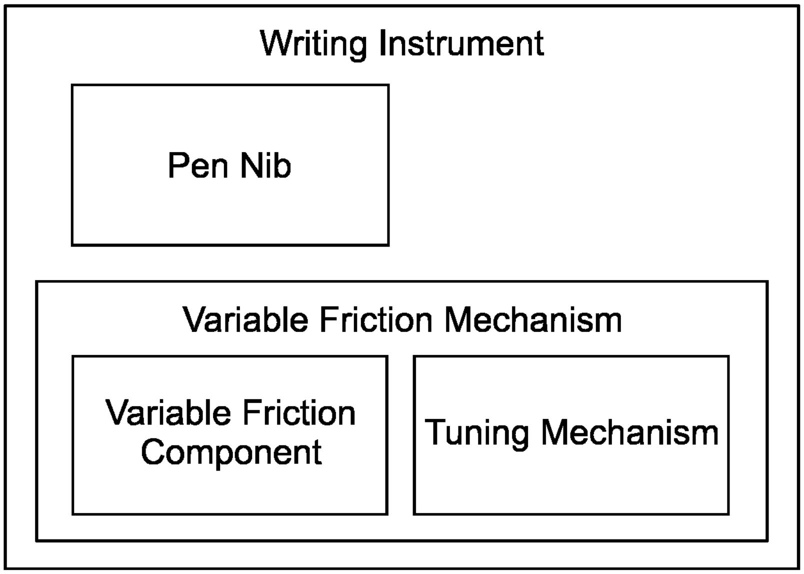
FIG. 2 is a block view of the writing instrument according to the present disclosure.

FIG. 2 presents a block view of a writing instrument according to the present disclosure. The writing instrument comprises two main parts: the pen nib, representing the writing end of the writing instrument (or writing implement), and the variable friction mechanism. On one hand, the pen nib may for instance comprise a socket and a ball positioned in the socket, as previously described. The function of the pen nib is mainly but not limited to partially store and convey writing material or liquid, such as ink, out of the writing instrument to be for example applied on a writing surface. On another hand, the variable friction mechanism may comprise at least one first component—the variable friction component—and optionally at least one second component—the tuning mechanism. The main but not limiting function of the variable friction mechanism is to control the friction at the interface between two components of the writing instrument, such as the ball and the socket, or between components of the writing instrument and external objects or surfaces, such as a ballpoint pen and a writing surface. The control of the friction between any of the elements is at least assured by the variable friction component and enhanced by the tuning mechanism.

For the description of the present disclosure, the "variable friction component" may be considered as the "at least one first component" and the "tuning mechanism" as the "at least one second component". Alternatively, the tuning mechanism may comprise more than one component. The additional components may then be named the "at least one third component", "at least one fourth component" and so on.

Figure 3:
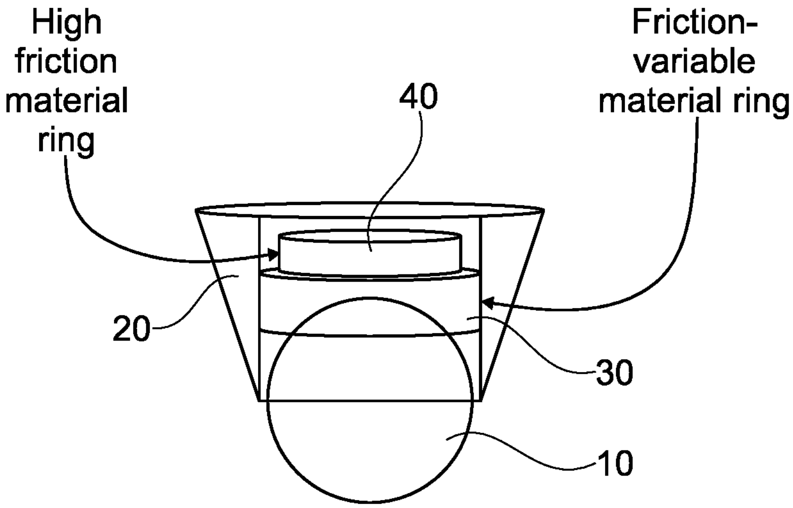
FIG. 3 is a schematic view of a writing end of a writing instrument according to the present disclosure.

FIG. 3 presents a ballpoint pen according to a preferred embodiment the present disclosure. A ball 10 is positioned within the passage of a socket 20 such that the ball 10 partially comes out of the socket 20 at an open end to come into contact with a writing surface during usage (e.g. writing). At least one first component 30 ("friction-variable material ring") and one second component 40 ("high-friction material ring") are positioned within the socket 20, above the ball 10, on the opposite side of the open end of the socket 20.

In this embodiment, the at least one first component 30 ("friction-variable material ring") has the form of a ring and is positioned above the ball 10 where it is in contact with the ball 10. The at least one first component 30 is made of a first material, for example a polymer, which surface comprises several microscale structure elements that bend under the action of the force from the ball. As for example shown in FIG. 4, the structure elements may comprise a cone extending from the base of the at least one first component, and a sphere integrally positioned on the narrow end of the cone. The surface of the sphere may be such that maximum half of the surface of the sphere (a first surface), which is situated on the side opposite to the cone, has a rough surface (black surface on the top of the ball in FIG. 4), and the rest of the surface (a second surface, situated towards the cone) has a smooth surface (at least smoother than the rough surface). Herein, the passage from the rough surface to the smooth surface is set by design to be sudden or progressive, depending on the intended use and effects targeted.

The ball is partially out of the socket and partially within the socket, where it is in contact with the at least one first component. When the writing instrument is pressed against a writing surface, the writing surface exerts a reaction force on the ball, which is ultimately expressed as a force exerted from the ball to the at least one first component. Additionally, when the user slides the writing instrument on the writing surface to write, the ball at least slides on the writing surface, but also ideally rotates within the socket. The rotation of the ball permits to the material or liquid, such as ink, stored in the reservoir of the writing instrument, to be conveyed to the writing surface (cf. FIG. 1).

Figure 4:
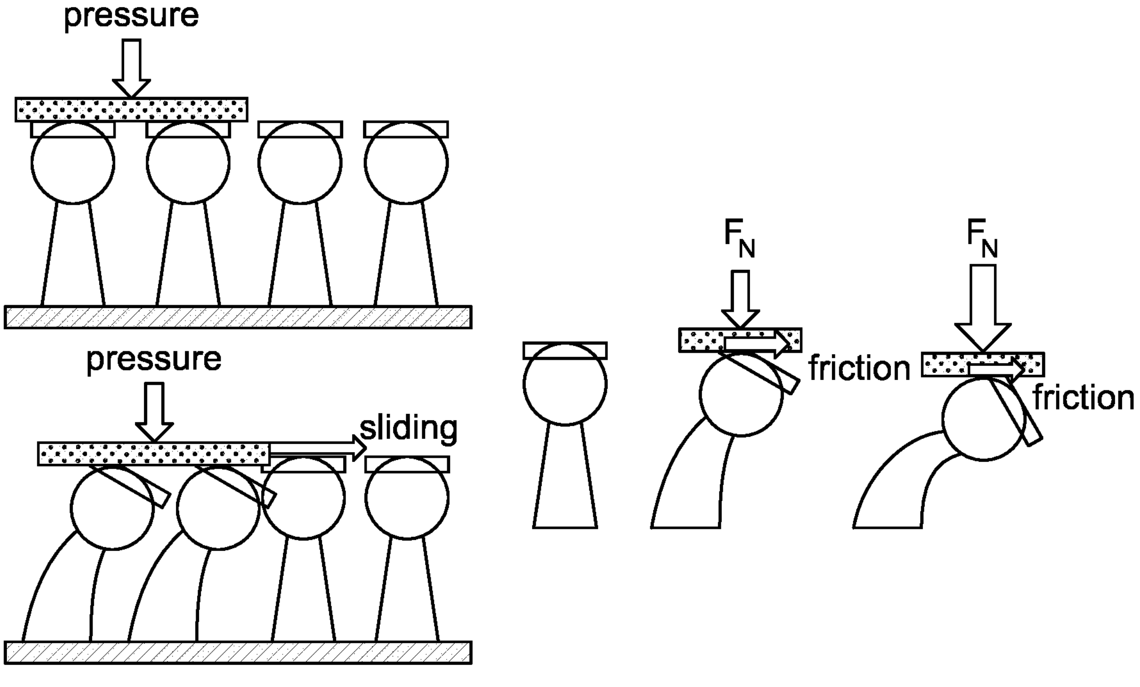
FIG. 4 is a schematic view of the surface elements of an at least one first component according to the present disclosure.

When the ball is in contact with the at least one first component without any pressure, the surface of the ball is particularly in contact with the top of the spheres of the structure elements of the at least one first component (see FIG. 4). Depending on the initial orientation (perpendicular on inclined) of the structure elements extending from the base of the at least one first component, whether only the effect of pression of the ball on the at least one first component (first case), or the combination of pression with the relative movement of the ball with respect to the writing surface (second case), leads to bending of the structure elements.

The first case occurs for example when the writing instrument is only being pressed against a surface, without relative movement. There, the ball is not in motion and even disabled from rotation, as it is stopped due to the contact with the structure elements (rough and/or smooth surface of the structure elements). In some preferred embodiment, even without pressure applied on the ball, the ball is in contact with the at least one first component to prevent the ball from rotation. This has the advantage that accidental writing (through ink flow) is avoided.

The second case occurs for example when the user is writing, and particularly carrying out a movement with the writing instrument on a writing surface. The force applied from the surface on the ball, combined with the sliding movement of the ball on the surface leads the ball to exert a normal force combined with a dynamic force (or friction force, or friction) on the at least one first component. The resulting force that is then applied on the structure elements brings the structure elements to bend in the direction of the resulting force from the ball on the sphere. Moreover, the surface of the ball and the surface of the sphere are then in relative movement to each other, which results in friction between the ball and the sphere. At low forces, the ball is in contact with the rough surface (or first surface) of the sphere, which presents a high friction between the ball and the at least one first component, thus a high resistance of the ball towards rotation.

When the force applied from the ball on the structure elements increases, the structure elements bend even more. The contact points or surfaces between the ball and the sphere of the structure elements changes and moves from the rough surface to the smooth surface; the friction between the ball and the at least one first component decreases. This phenomenon of decreasing friction force when the applied force increases is advantageous as it permits, through detailed definition of the surface properties of the at least one first component (variable friction component), to control precisely and passively the friction behavior between to components of a writing instrument (e.g. a ball and socket in a ball-point pen) or between a writing instrument and external objects (e.g. a pen and a paper).

In any other embodiment, the roughness values of the different surfaces constituting the at least one first component can be chosen in a way to obtain specific friction evolution properties depending on the intended use.

The at least one first component 30 may be manufactured by 3D-printing on a microscale. 3D-printing techniques are widely developed and used in industries (electronic components for example) requesting elements with dimensions defined at microscale. Additionally, the 3D-printing devices can assure the reproduction for series usage, which is for instance needed in the manufacturing of writing instruments.

Alternatively, in other embodiments, the at least one first component can be made of and/or coated with any suitable material suitable to fit within the writing instrument and suitable to get in contact with the fluids present in any part of the writing instrument. Further, the at least one first component can be manufactured by any other process capable to shape the surface of the component on at least microscale.

The structural aspects described lead to the physical property of the first material to have a variable friction coefficient depending on the force (or pressure) applied on its surface. In particular, the structural elements of the surface of the first material may be set by design such that the friction coefficient between the surface of the first material and for example the ball decreases when the force acting from the ball on the at least one first component 30 increases. This material may be called a "negative coefficient of friction" material, which name describes the physical property of decreasing friction coefficient with increased force or pressure. For example, the surface elements may be dimensioned at microscale to meet targeted stiffness and friction properties before being manufactured by 3D-printing. Through controlled 3D-printing process, the reproduction of the physical properties may be assured. Further, the physical properties of the structural elements can be fine-tuned to fit as much as possible the intended use.

Alternatively, any other type of deformation of the structural elements may be considered. The structural or geometrical aspects of the at least one first component 30 (or variable friction component) may be selected based on the component's intended use. Independently of the embodiment selected, the structure of the surface elements of the at least one first component 30 directly defines the physical properties, such as stiffness and damping, of the variable friction component. Both stiffness and damping are properties that, when set through a desired and designed friction-pressure relationship, further allow to control the resistance of the ball motion in a ballpoint pen and the resistance between a writing instrument and different surfaces.

For example, the at least one first component may comprise structure elements extending in form of a fork with at least two branches from the base of the at least one first component. Both branches may be symmetrical and comprise each, on its end, two surfaces with different roughness properties. The surfaces may be configured such that the surface with the higher roughness values (first surface) are positioned outside of the surface with the lower roughness values (second surface). Further, only the surfaces with the high roughness value may be in contact with the ball when no force is applied from the ball on the at least one first component. When the force from the ball on the structure elements increases, the ball is pressed to the fork which deforms such that the branches make an opening movement. Due to this movement, the contact between the ball and the surface or high roughness values moves suddenly or progressively to the surfaces with the lower roughness values. The contact area between the ball and the surfaces with the higher roughness value decreases while the contact area between the ball and the surfaces with the lower roughness value increases.

In further considerations, the roughness values of the respective first and second surfaces of the structure elements may be inverted, i.e. the first surface presents a lower roughness value than the second surface. In even further considerations, one structure element can comprise more than two surfaces with different roughness (or friction) values, arranged lower or higher towards each other depending on the intended use.

The disclosure is not limited to the preferred embodiment, therefore the at least one first component 30 may be one part as shown or a combination of more than one part. Alternatively, the at least one first component 30 may make up part or all of the writing end (pen nib) to vary the friction coefficient between the writing end and the writing surface. The at least one second component 40 is part of the tuning mechanism described in FIG. 2 and is, in this preferred embodiment, forming a smaller ring compared to the at least one first component 30. It is positioned above the ball 10 in the aperture of the first component 30, without being in contact with the ball 10 in a first state. The at least one second component 40 is made of a second material that has increasing friction coefficient properties when the writing force increases. The second material may be made or a metal material (for example steel) or a plastic material, and the at least one second component may be entirely constituted by or alternatively coated with the second material. The disclosure is not limited to the preferred embodiment, therefore the at least one second component 40 may be one part as shown or a combination of more than one part.

Figure 6:
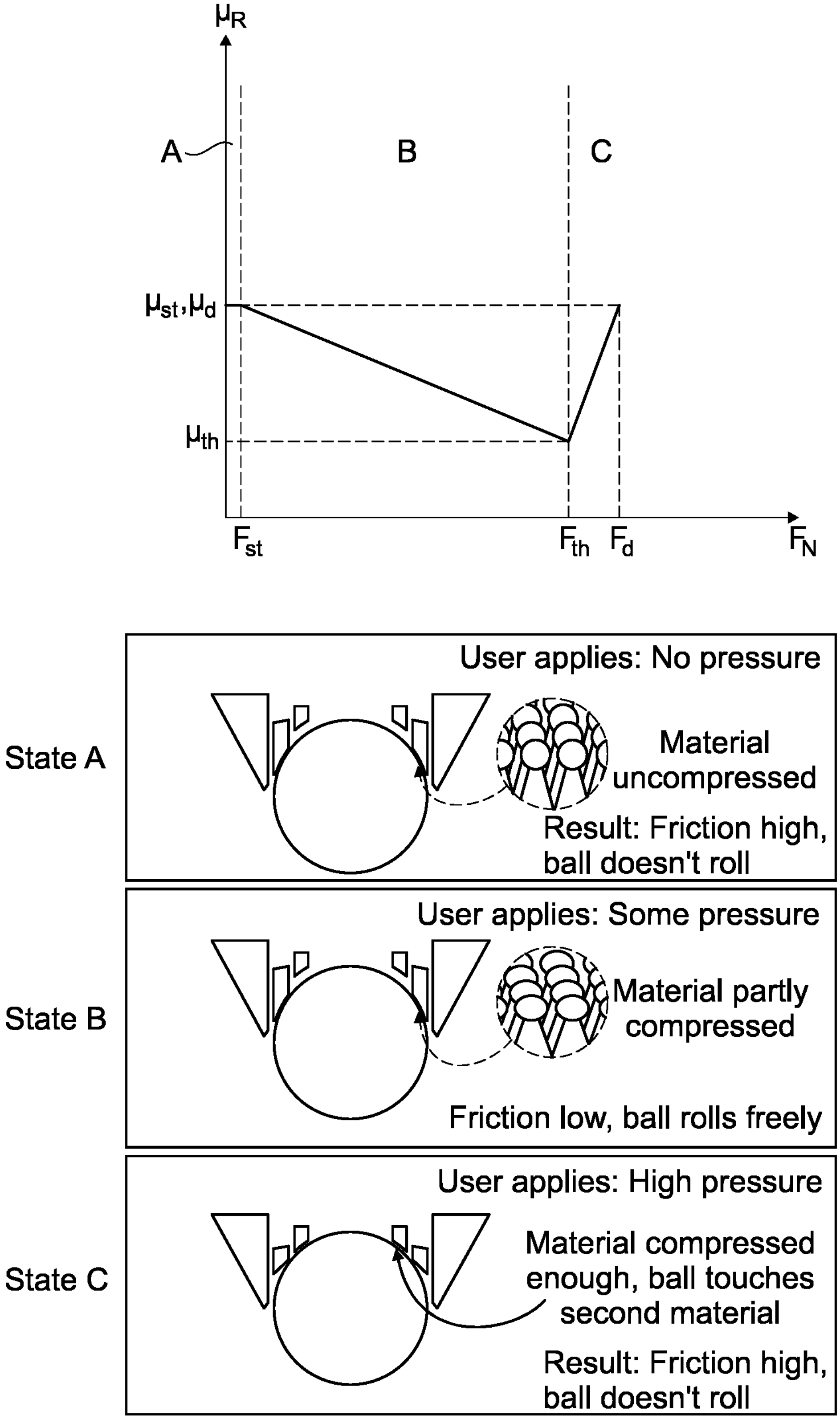
FIG. 6 is a friction-force relationship graph according to the embodiment of the writing instrument in FIG. 3.

Both the at least one first component 30 and the at least one second component 40 present inclined inner surfaces that are in contact with the ball 10 (shown in FIG. 6). As alternative to the shown embodiment, the at least one first component 30 and the at least one second component 40 could be each at least spherical, circular, conical or any other form that could fit to the environment they are positioned in and to come in contact with the ball 10. Additionally, the contact surfaces of the at least one first component 30 and the at least one second component 40 with the ball 10 may be spherical or concave, wherein the curvature radius of the spherical or concave surface of the components may equal the outer radius of the ball 10.

Figure 5:
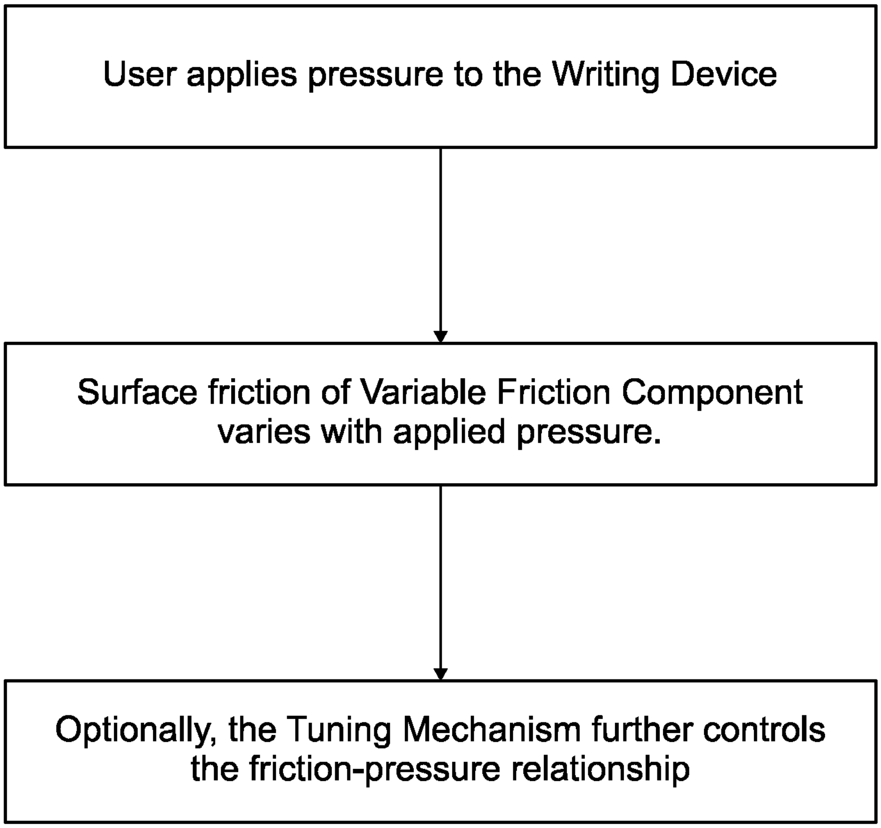
FIG. 5 is a method diagram describing the use of the writing instrument of the present disclosure.

The method diagram of FIG. 5 summarizes the main effects of the usage of a writing instrument according the to present disclosure. When writing, the user applies a force with the writing instrument (or writing device) to the writing surface. The force acting from the writing surface to the ball is expressed as the force acting from the ball to the at least one first component (variable friction component of the variable friction mechanism). Once the static friction between the ball and the at least one first component the ball is in contact with, is overcome, the dynamic friction coefficient between the ball and the at least one first component determines the friction-force relationship between the two components.

Considering the physical properties of the at least one first component as described previously, the dynamic friction coefficient at the interface between the ball and the at least one first component decreases when the force acting from the ball on the at least one first component increases while having a relative movement of the ball surface with respect to the at least one first component. The friction coefficient of the at least one first component is at least proportional to the pressure applied to the surface of the component. The rotation movement of the ball within the socket is facilitated with increased writing force from the user and permits an easy sliding movement of the ball on the writing surface.

Optionally, and to further control the friction-force relationship within the writing instrument, the tuning mechanism, incorporated by the at least one second component, may come into contact with the ball when the writing force applied by the user exceed a certain value; the ball is then simultaneously in contact with the at least one first component and the at least one second component. According to the increasing friction coefficient properties of the at least one second component when the force acting from the ball on the at least one second component increases, the resulting friction response of the variable friction mechanism may lead to an increased friction between the ball and the components, linked with a disabled rotation of the ball within the socket, thus a stopped flow of material or liquid, such as ink, from the writing instrument to the writing surface. The inversion of the friction level from low to high can be progressive or sudden, depending on the physical friction properties of the at least one second component. With that, a passive (compared to powered) variability of the coefficient of friction of the surfaces in action with the ball is achieved.

The advantage of providing a writing instrument with a variable control of the resistance of the ball motion and of the resistance between the instrument and a writing surface, and more particularly variable control of the friction between two components, allows a greater control over the feel and the utility of the writing instrument for the user. A first detailed advantage of the disclosure is that the ball in a ballpoint pen can be prevented from rotating without first applying a pressure, which permits to e.g. avoid accidental writing. A second detailed advantage is that the ball can further be prevented from rotating under a too high applied pressure, which prevents the material or liquid, such as ink to flow, and avoids for example an over-pressure of the writing instrument while writing. A third detailed advantage is that a fine control over the frictional feel of the writing instrument is enabled, and more particularly between "smoother" and "rougher" feels. A fourth detailed advantage is that the frictional interface between a pen nib and the writing surface can be varied, such that the best friction can be applied for different surfaces.

The tuning mechanism may enable more complex friction-pressure relationships within the variable friction mechanism of the writing instrument. By adding at least one second component with high-friction coefficient properties to the variable friction mechanism, the resulting friction response of the writing instrument can be controlled. Any added component presents the physical property of increasing friction coefficient between the ball and the added component when the ball is in contact with the added component and the force applied from the ball to the added component increases. The threshold force at which the ball comes into contact with the at least one second component may be set in relation with the stiffness and deformation behavior of the surface elements of the at least one first component. Different ranges of forces for which the friction coefficient varies can be set by adding more friction components with different friction properties to the tuning mechanism. Alternatively, a complex friction-pressure relationship may be a response in which friction is only low (alternatively high) at a narrow range of applied forces (or pressures), and high (alternatively low) for all others.

The tuning mechanism may consist of components with surfaces of designed or known coefficients of friction, geometries and physical properties. For example, a spring of designed spring constant may be attached to the at least one second component. With enough force acting on the spring, the at least one second component can come into contact with the ball and the resulting friction coefficient increases as a step change at that acting force. Alternatively, the variable friction component itself may act as a part of the tuning mechanism, when for example the spring constant of the variable friction component allows to determine when the friction coefficient switches from a low state to a high state.

The value of the forces acting within a writing instrument using a ball in a socket (i.e. ballpoint pen) can, for the present disclosure, be reduced to the forces acting from the writing surface on the ball, and, more particularly, reduced to the forces acting from the ball to an at least one first component (or variable friction component). Generally, the force range in which any ballpoint pen can be measured against reaches from 0 N to 10 N, in particular from 0 N to 8 N, more in particular from 0 N to 6 N. The force range can further be divided in a first force range, covering the low forces values and corresponding to a “smooth” or “low-speed” writing behavior, and a second force range, covering the high force values and corresponding to a “rough” or “high-speed” writing behavior. The first force range defines the force values situated in the range of 0.01 N to 5 N, in particular 0.1 N to 2 N, more in particular 0.1 N to 0.5 N and the second force range respectively the force values situated in the range of 5 N to 10 N, in particular 2 N to 10 N, more in particular 0.5 N to 10 N. In some cases, the ball may first need to come into contact with the at least one first component. For this, a very low force range can be defined, for which the force between the surface and the ball is lower than 1 N, in particular lower than 0.8 N, more particular lower than 0.5 N.

Resulting from the decrease below a threshold value of the friction coefficient between the ball and the friction components while writing, the sliding feeling of the ball on the writing surface is improved. This effect can be expressed through the relation between the friction coefficient value and the force applied from the user with the writing instrument on the writing surface. The evolution of the friction coefficient value between the ball and the at least one first component with increased writing force can, for example, be observed in following conditions: an adult using a writing instrument having a ball in a socket, wherein the diameter of the ball is lower than 10 mm, in particular lower than 0.8 mm, more particular lower than 0.6 mm, the direction of the writing instrument is perpendicular to the writing surface, and the writing speed is constant at 1 cm/s. When the user increases the force applied with the writing instrument on the writing surface from 1 N to 2 N, the friction coefficient between the ball and the at least one first component of the writing instrument decreases from less than twice the friction coefficient value at 1 N, in particular less than 1.90 times more particular less than 1.80 times.

FIG. 6 presents three states of the writing end of FIG. 3 and FIG. 4 that commonly occur during usage by a user. The states are shown in relation with the friction-force behavior of the writing end. More particularly, the graph presents the resulting friction coefficient $\mu_R$ between the ball and any of the at least one first or one second component it is in contact with, in relation to the normal force $F_N$ acting from the ball on the at least one first component when the ball is in rotation within the socket of the writing instrument (which is directly in relation with the force acting between the ball and the writing surface). The friction coefficient is defined with following relation: $\mu_R=F_R/F_N$, wherein $F_R$ is the resulting dynamic force acting between the ball and the at least one first component (respectively between the ball and the at least one first component and at least one second component) and $F_N$ is the normal force acting from the ball on the at least one first component (respectively between the ball and the at least one first component and at least one second component).

In state A, the writing end of the ballpoint pen is not subjected to any force by the user. In area A of the friction-force graph, the ball 10 is in contact with the at least one first component 30 and static friction is the only resistance acting between the ball 10 and the at least one first component 30, which results in a non-rotating state of the ball.

In state B, the user applies a writing force on the writing instrument. The static friction force ($F_{at}$), defining a static friction coefficient, is overcome and the ball rotates freely within the socket with effect of the force exerted by the user with the writing instrument on the writing surface, combined with the writing movement. The force between the ball and the at least one first component defines a low-friction area (area B), in which the ball is only in contact with the at least one first component. Herein, as consequence of the defined structural aspects of the at least one first component described for FIG. 3, the friction coefficient decreases when the force acting from the ball on the at least one first component increases while having a relative movement of the ball surface with respect to the at least one first component. The relationship between the resulting friction coefficient and the normal force has been simplified to be linear, nevertheless, the decrease of the resulting friction coefficient may, in real conditions and due to the structure properties of the at least one first component, progress in a non-linear manner when the contact points or surfaces between the ball and the surfaces of the first material switch.

Looking more in details in the relationship between the normal force applied from the ball on the at least one first component and the dynamic force acting between the ball surface and the surface of the at least one first component, the dynamic force may increase when the normal force increases within a certain range of forces within area B, or decrease when the normal force increases within another certain range of forces within area B. Increase or decrease is directly in relation with the resulting friction force of the contact areas in contact with the ball and may be determined during manufacturing.

In state C, the user applies a high writing force on the writing end and the ball has stopped to rotate. At the threshold force ($F_{th}$), the ball comes into contact with the at least one second component to be simultaneously in contact with the at least one first component and the at least one second component; the rotation of the ball becomes harder when the force increases and is disabled to rotate when a disabling force ($F_d$) is reached. In certain embodiments, $\mu_{th}$ and $\mu_d$ can be equal, as shown in the graph. The force range above the threshold force defines the high-friction area (area C). Over the above described writing force range with a ballpoint pen, considering that the force acting between the ball and the at least one first component is maximum 10 N, the friction coefficient between the ball and the at least one first component is in the range of 0.01 to 0.8, in particular 0.01 to 0.9, more particular 0.1 to 0.99. Further, considering that the force acting between the ball and the at least one second component is equal to the threshold force the friction coefficient between the ball and the at least one second component is in the range of 0.01 to 0.99, in particular 0.01 to 0.95, more particular 0.01 to 0.9.

Figure 7:
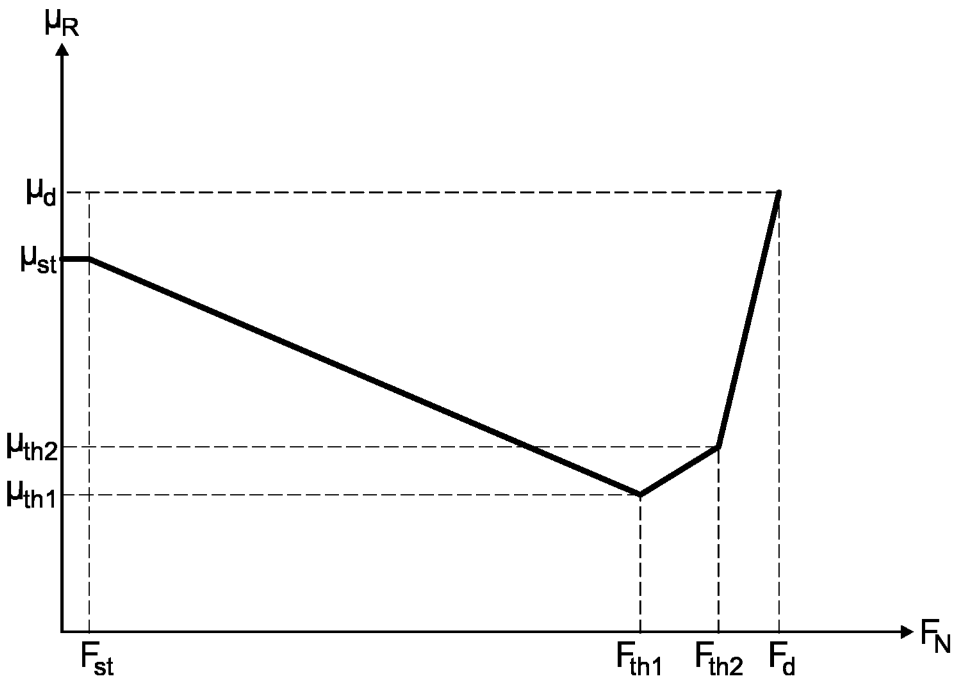
FIG. 7 is a friction-force relationship graph of an alternative writing instrument.

Alternatively, FIG. 7 shows a graphical representation of an embodiment of a writing instrument according to the system described in FIG. 2, wherein the tuning mechanism comprises at least two friction components with at least two different material with different friction properties. From 0 N to a first threshold force $F_{th1}$, the ball is only in contact with the variable friction component. Once the static friction force $F_{st}$, resulting in the static friction coefficient $\mu_{st}$ is overcome, the dynamic friction coefficient between the ball and the variable friction component decreases when the force of the ball acting on the variable friction coefficient increases. At a first threshold force $F_{th1}$, the ball comes into contact with at least one second component, which is part of the tuning mechanism. From this force, the resulting dynamic friction coefficient between the ball and the two friction components in contact with the ball increases. Optionally, at a second threshold force $F_{th2}$, the ball comes into contact with at least one third component of the tuning mechanism. From this force $F_{th2}$, the resulting dynamic friction coefficient between the ball and the three friction components increases until the resulting friction between the ball and the friction components disables the rotation of the ball within the socket (at $F_d$).

Although the present disclosure has been described above and is defined in the attached claims, it should be understood that the disclosure may alternatively be defined in accordance with the following embodiments:

1. A writing instrument configured to apply a writing material or liquid to a surface, comprising a socket, and a ball arranged in the socket,
   characterized by at least one first component which is arranged to come into contact with the ball, wherein the at least one first component comprises a first material having surface properties such that the friction coefficient between the ball and the at least one first component decreases when the force acting from the ball on the at least one first component increases at least within a certain range of forces.
2. A writing instrument according to embodiment 1, wherein the decreasing friction coefficient between the ball and the at least one first component refers to the dynamic friction coefficient, and wherein the friction coefficient between the ball and the at least one first component decreases in case of an increasing force acting from the ball on the at least one first component while having a relative movement of the ball surface with respect to the at least one first component after having overcome the static friction.
3. A writing instrument according to any of the previous embodiments, wherein, within at least a certain range of forces, the dynamic force acting between the ball and the at least one first component decreases when the force acting from the ball on the at least one component increases, while having a relative movement from the ball surface with respect to the at least one first component.
4. A writing instrument configured to apply a writing material or liquid to a surface, comprising a socket, and a ball arranged in the socket, characterized by at least one first component in contact with the ball, wherein within at least one certain range of forces, the dynamic force acting between the ball and the at least one first component decreases when the force acting from the ball on the at least one component increases, while having a relative movement from the ball surface with respect to the at least one first component.
5. A writing instrument according to any of the previous embodiments, wherein the first material comprises one or more surface elements in contact with the ball, wherein the one or more surface elements comprise at least one first surface having at least one first surface roughness and at least one second surface having at least one second surface roughness that is smaller than the at least one first surface roughness, wherein the surface area of the at least one second surface in contact with the ball increases when the force acting from the ball on the at least one first component increases.
6. A writing instrument according to embodiment 5, wherein the surface area of the at least one first surface in contact with the ball decreases when the force acting from the ball on the at least one first component increases.
7. A writing instrument according to any of the previous embodiments, wherein the surface area of the at least one first surface in contact with the ball decreases when the surface area of the at least one second surface in contact with the ball increases, and vice versa.
8. A writing instrument according to any of the previous embodiments, wherein the one or more surface elements is configured to bend under the action of the force from the ball.
9. A writing instrument according to any of the previous embodiments, wherein the surface area of the at least one first surface is made of one or a combination of more than one smaller surface areas.
10. A writing instrument according to any of the previous embodiments, wherein the surface area of the at least one second surface is made of one or a combination of more than one smaller surface areas.
11. A writing instrument according to any of the previous embodiments, wherein the surface area of the at least one first surface and the surface area of the at least one second surface are in contact or distant from each other.
12. A writing instrument according to claim any of the previous embodiments, wherein the first material is made of a plastic material.
13. A writing instrument according to any of the previous embodiments, wherein the at least one first component is entirely constituted of the first material or coated with the first material.
14. A writing instrument according to any of the previous embodiments, wherein the at least one first component has one or more contact surfaces with the ball.
15. A writing instrument according to any of the previous embodiments, wherein the at least one first component is one part or a combination of more than one parts.
16. A writing instrument according to any of the previous embodiments, wherein the one or more contact surfaces of the at least one first component with the ball is at least partially plane, or curved, or circular, or spherical, or conical.
17. A writing instrument according to any of the previous embodiments, wherein the one or more contact surfaces of the at least one first component is inclined.
18. A writing instrument according to any of the previous embodiments, wherein the one or more contact surfaces of the at least one first component is spherical or concave, wherein the curvature radius of the spherical or concave surface of the at least one first component equals the outer radius of the ball.
19. A writing instrument according to any of the previous embodiments, wherein the force acting from the ball on the at least one first component during writing is in the range of 0 to 10 N, in particular 0 to 8 N, more in particular 0 to 6 N.
20. A writing instrument according to any of the previous embodiments, wherein the force acting from the ball on the at least one first component defines at least one first force range and at least one second force range.
21. A writing instrument according to embodiment 20, wherein the first force range is situated in the range of 0.01 N to 5 N, in particular 0.1 N to 2 N, more in particular 0.1 N to 0.5 N and the second force range is respectively situated in the range of 5 N to 10 N, in particular 2 N to 10 N, more in particular 0.5 N to 10 N.
22. A writing instrument according to any of the previous embodiments, wherein the friction coefficient between the ball and the at least one first component is higher in the at least one first force range compared to the at least one second force range, wherein the friction coefficient between the ball and the at least one first component is lower.

23. A writing instrument according to any of the previous embodiments, wherein the ball and the at least first one component come into contact when the force between the ball and the surface is lower than 1 N, in particular lower than 0.8 N, more particular lower than 0.5 N.

24. A writing instrument according to any of the previous embodiments, wherein the force acting from the ball on the at least one first component increases when the force acting from the surface on the ball increases.

25. A writing instrument according to any of the previous embodiments, wherein the friction coefficient between the ball and the at least one first component is in the range of 0.01 to 0.8, in particular 0.01 to 0.9, more particular 0.1 to 0.99 when the force acting between the ball and the at least one first component is maximum 10 N.

26. A writing instrument according to any of the previous embodiments, further comprising a spring arranged within the socket, wherein the spring is in contact with the at least one first component at a proximal end of the at least one first component.

27. A writing instrument according to embodiment 26, wherein the spring is compressed when the force acting from the ball on the at least one first component increases and vice versa.

28. A writing instrument according to any of the previous embodiments, further comprising at least one second component which is arranged to come into contact with the ball, wherein the at least second component comprises a second material having surface properties such that the friction coefficient between the ball and the at least one second component increases when the force acting from the ball on the at least one second component increases at least within a certain range of forces.

29. A writing instrument according to embodiment 28, wherein the second material is made of a metal material.

30. A writing instrument according to embodiment 28, wherein the second material is made of a plastic material.

31. A writing instrument according to any of the previous embodiments, wherein the at least one second component is entirely constituted of the second material or only coated with the second material.

32. A writing instrument according to any of the previous embodiments, wherein the at least one second component has one or more contact surfaces with the ball.

33. A writing instrument according to any of the previous embodiments, wherein the at least one second component is one part or a combination of more than one parts.

34. A writing instrument according to any of the previous embodiments, wherein the one or more contact surfaces of the at least one second component with the ball is at least partially plane, or curved, or circular, or spherical, or conical.

35. A writing instrument according to any of the previous embodiments, wherein the one or more contact surfaces of the at least one second component is inclined.

36. A writing instrument according to any of the previous embodiments, wherein the one or more contact surfaces of the at least one second component is spherical or concave, wherein the curvature radius of the spherical or concave surface of the at least one second component equals the outer radius of the ball.

37. A writing instrument according to any of the previous embodiments, wherein the ball comes into contact with the at least one second component when the force acting from the ball on the at least one first component reaches a threshold force.

38. A writing instrument according to embodiment 37, wherein the threshold force is situated within the second force range.

39. A writing instrument according to any of the previous embodiments, wherein the friction coefficient between the ball and the at least one second component is higher than the friction coefficient between the ball and the at least one first component.

40. A writing instrument according to any of the previous embodiments, wherein the friction coefficient between the ball and the at least one second component is in the range of 0.01 to 0.99, in particular 0.01 to 0.95, more particular 0.01 to 0.9 when the force acting between the ball and the at least one second component is equal to the threshold force.

41. A writing instrument according to any of the previous embodiments, wherein the ball is in simultaneous contact with the at least one first component and the at least one second component.

42. A writing instrument according to any of the previous embodiments, wherein the resulting friction coefficient of the simultaneous contact between the ball and the at least one first component and the at least one second component increases when the force acting from the ball on the at least one first component and the at least one second component increases.

43. A writing instrument according to any of the previous embodiments, wherein the socket comprises a passage extending longitudinally across the socket, a proximal end and a distal end.

44. A writing instrument according to embodiment 43, wherein the ball is arranged in the passage at the distal end of the socket.

45. A writing instrument according to any of the previous embodiments, wherein the passage of the socket is arranged in a way to receive and hold the ball at least partially within the passage of the socket and partially outside of the distal end of the socket, such that the ball can be in contact with the surface.

46. A writing instrument according to any of the previous embodiments, wherein the ball rotates within the socket when the ball is slid on the surface.

47. A writing instrument according to embodiment 46, wherein the rotation of the ball is disabled by the at least one first component at least within a range of forces.

48. A writing instrument according to any of the previous embodiments, wherein the rotation of the ball is disabled by the at least one second component at least within a range of forces.

49. A writing instrument according to any of the previous embodiments, further comprising a reservoir configured to contain the material or liquid for applying on the surface.

50. A writing instrument according to embodiment 49, wherein the reservoir is connected with the socket.

51. A writing instrument according to any of the previous embodiments, wherein the material or liquid flows from the reservoir to the passage of the socket.

52. A writing instrument according to any of the previous embodiments, wherein the rotation of the ball conveys the material or the liquid from the passage of the socket to the surface.

53. A writing instrument according to any of the previous embodiments, wherein the material or liquid is made of at least a solvent of oil or water containing dye or pigment particles.

The invention claimed is:

1. A writing instrument configured to apply a writing material or liquid to a surface, comprising a socket, and a ball arranged in the socket, characterized by at least one first component which is arranged to come into contact with the ball, wherein the at least one first component comprises a first material having surface properties such that the friction coefficient between the ball and the at least one first component decreases when the force acting from the ball on the at least one first component increases at least within a certain range of forces.

2. The writing instrument according to claim 1, wherein the decreasing friction coefficient between the ball and the at least one first component refers to the dynamic friction coefficient, and wherein the friction coefficient between the ball and the at least one first component decreases in case of an increasing force acting from the ball on the at least one first component while having a relative movement of the ball surface with respect to the at least one first component after having overcome the static friction.

3. The writing instrument according to claim 1, wherein, within at least a certain range of forces, the dynamic force acting between the ball and the at least one first component decreases when the force acting from the ball on the at least one first component increases, while having a relative movement from the ball surface with respect to the at least one first component.

4. The writing instrument according to claim 1, wherein the first material comprises one or more surface elements in contact with the ball, wherein the one or more surface elements comprise at least one first surface having at least one first surface roughness and at least one second surface having at least one second surface roughness that is smaller than the at least one first surface roughness, wherein the surface area of the at least one second surface in contact with the ball increases when the force acting from the ball on the at least one first component increases.

5. The writing instrument according to claim 4, wherein the surface area of the at least one first surface in contact with the ball decreases when the force acting from the ball on the at least one first component increases when the surface area of the at least one second surface in contact with the ball increases, and vice versa.

6. The writing instrument according to claim 4, wherein the surface area of the at least one first surface in contact with the ball decreases when the surface area of the at least one second surface in contact with the ball increases, and vice versa.

7. The writing instrument according to claim 1, wherein the one or more surface elements is configured to deform under the action of the force from the ball.

8. The writing instrument according to claim 1, wherein the surface area of the at least one first surface is made of one or a combination of more than one smaller surface areas and/or wherein the surface area of the at least one second surface is made of one or a combination of more than one smaller surface areas.

9. The writing instrument according to claim 1, wherein the surface area of the at least one first surface and the surface area of the at least one second surface are in contact or distant from each other.

10. The writing instrument according to claim 1, wherein the first material is made of a plastic material and/or wherein the at least one first component is entirely constituted of the first material or coated with the first material.

11. The writing instrument according to claim 1, wherein the at least one first component has one or more contact surfaces with the ball.

12. The writing instrument according to claim 11, wherein the one or more contact surfaces of the at least one first component with the ball is at least partially plane, or curved, or circular, or spherical, or conical and/or wherein the one or more contact surfaces of the at least one first component is inclined.

13. The writing instrument according to claim 11, wherein the one or more contact surfaces of the at least one first component is spherical or concave, wherein the curvature radius of the spherical or concave surface of the at least one first component equals the outer radius of the ball.

14. The writing instrument according to claim 1, wherein the force acting from the ball on the at least one first component defines at least one first force range and at least one second force range.

15. The writing instrument according to claim 1, wherein the force acting from the ball on the at least one first component increases when the force acting from the surface on the ball increases.

16. The writing instrument according to claim 1, further comprising at least one second component which is arranged to come into contact with the ball, wherein the at least second component comprises a second material having surface properties such that the friction coefficient between the ball and the at least one second component increases when the force acting from the ball on the at least one second component increases at least within a certain range of forces.

17. The writing instrument according to claim 16, wherein the ball comes into contact with the at least one second component when the force acting from the ball on the at least one first component reaches a threshold force and/or wherein the threshold force is situated within the second force range.

18. The writing instrument according to claim 16, wherein the friction coefficient between the ball and the at least one second component is higher than the friction coefficient between the ball and the at least one first component.

19. The writing instrument according to claim 16, wherein the ball is in simultaneous contact with the at least one first component and the at least one second component.

20. A writing instrument configured to apply a writing material or liquid to a surface, comprising a socket, and a ball arranged in the socket, characterized by at least one first component in contact with the ball, wherein within at least one certain range of forces, the dynamic force acting between the ball and the at least one first component decreases when the force acting from the ball on the at least one component increases, while having a relative movement from the ball surface with respect to the at least one first component.

* * * * *